United States Patent
Fu et al.

(10) Patent No.: US 10,437,779 B2
(45) Date of Patent: *Oct. 8, 2019

(54) INTELLIGENT INTERACTIVE SCREEN CAPTURE

(71) Applicant: International Business Machines Corporation, Armonk, NY (US)

(72) Inventors: Lin Fu, Shanghai (CN); Di Hu, Shanghai (CN); Shi Kun Li, Shanghai (CN); Ka Lin, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 242 days.

This patent is subject to a terminal disclaimer.

(21) Appl. No.: 14/881,210

(22) Filed: Oct. 13, 2015

(65) Prior Publication Data

US 2016/0283073 A1 Sep. 29, 2016

Related U.S. Application Data

(63) Continuation of application No. 14/670,854, filed on Mar. 27, 2015.

(51) Int. Cl.
| | |
|---|---|
| *G06F 9/451* | (2018.01) |
| *G06F 16/14* | (2019.01) |
| *G06F 8/71* | (2018.01) |
| *G06F 9/445* | (2018.01) |

(52) U.S. Cl.
CPC .............. *G06F 16/148* (2019.01); *G06F 8/71* (2013.01); *G06F 9/445* (2013.01); *G06F 9/451* (2018.02)

(58) Field of Classification Search
CPC combination set(s) only.
See application file for complete search history.

(56) References Cited

U.S. PATENT DOCUMENTS

| | | | |
|---|---|---|---|
| 8,571,319 B2 | 10/2013 | Balasubramanian et al. | |
| 8,589,423 B2 | 11/2013 | Kern et al. | |
| 8,701,001 B2 | 4/2014 | Dovey et al. | |
| 2002/0026478 A1* | 2/2002 | Rodgers | G06F 8/65 709/205 |
| 2002/0033844 A1 | 3/2002 | Levy et al. | |

(Continued)

FOREIGN PATENT DOCUMENTS

| | | |
|---|---|---|
| DE | 102016205009 A1 | 9/2016 |
| WO | 2010030914 A2 | 3/2010 |

OTHER PUBLICATIONS

"Auto-scroll window during window capture", Screen Capture, downloaded Feb. 3, 2015, <http://www.etrusoft.com/screenshot-maker-online-help/autoscroll.htm>.

(Continued)

*Primary Examiner* — Doon Y Chow
*Assistant Examiner* — Wendy Nicholas
(74) *Attorney, Agent, or Firm* — Christopher K. McLane

(57) ABSTRACT

In an approach for creating a screen capture, a computer selects at least a portion of visual output on a computing device, wherein the selected visual output includes one or more instances of application software. The computer identifies metadata associated with the one or more instances of application software in the selected visual output. The computer creates a screen capture file that includes the selected visual output and the identified metadata.

9 Claims, 4 Drawing Sheets

(56) References Cited

U.S. PATENT DOCUMENTS

| | | | |
|---|---|---|---|
| 2003/0163531 A1* | 8/2003 | Nakajima | G06Q 10/107 709/206 |
| 2005/0210056 A1* | 9/2005 | Pomerantz | G06F 17/30067 |
| 2006/0133340 A1 | 6/2006 | Rybak | |
| 2006/0150182 A1* | 7/2006 | Hughes | G06F 8/61 717/174 |
| 2008/0189648 A1 | 8/2008 | Anglin et al. | |
| 2009/0031227 A1 | 1/2009 | Chakrabarti et al. | |
| 2009/0249189 A1 | 10/2009 | Jania et al. | |
| 2010/0210293 A1 | 8/2010 | Lim et al. | |
| 2011/0202854 A1* | 8/2011 | Chan | G06F 3/1454 715/762 |
| 2011/0264709 A1* | 10/2011 | Beardsmore | G06F 9/4443 707/804 |
| 2011/0289117 A1* | 11/2011 | Agrawal | G06Q 10/00 707/802 |
| 2012/0010995 A1 | 1/2012 | Skirpa et al. | |
| 2012/0120320 A1 | 5/2012 | Chowdhry et al. | |
| 2012/0203854 A1 | 8/2012 | Chan et al. | |
| 2012/0221946 A1* | 8/2012 | Dovey | G06F 9/451 715/273 |
| 2012/0272139 A1* | 10/2012 | Kern | G06F 17/30259 715/234 |
| 2013/0227455 A1 | 8/2013 | Lee et al. | |
| 2014/0123018 A1* | 5/2014 | Park | G06F 3/0484 715/738 |
| 2014/0327831 A1 | 11/2014 | Liu et al. | |
| 2014/0365912 A1* | 12/2014 | Shaw | G06F 3/04817 715/748 |
| 2015/0058369 A1* | 2/2015 | Kong | H04L 67/02 707/756 |
| 2015/0220814 A1* | 8/2015 | Verkasalo | G06Q 20/322 382/103 |

OTHER PUBLICATIONS

Lin Fu, et al., "Intelligent Interactive Screen Capture", U.S. Appl. No. 14/670,854, filed Mar. 27, 2015.

List of IBM Patents or Patent Applications Treated as Related, Appendix P, Filed Herewith, 2 pages.

"A Dictionary of Computer Science", 2016, Oxford University Press, 7th ed. http://www.oxfordreference.com/view/10.1093/acref/9780199688975.001.0001/acref-9780199688975-e-6705?rskey=UK36DL&result=1, accessed on line Sep. 11, 2018 (Year: 2016).

\* cited by examiner

INTELLIGENT INTERACTIVE SCREEN CAPTURE

BACKGROUND OF THE INVENTION

The present invention relates generally to the field of software, and more particularly to creating a screen capture capable of activating local applications for further utilization.

A screen capture (e.g., screen shot, screen grab, screen dump, etc.) is a digital image taken by a computing device to record the visible information displayed on a visual output device that is saved as a static graphics file (i.e., takes a snapshot or picture of the visual output shown to a user of the computing device). Screen captures are created when a user selects at least a portion of the visual output and utilizes functions of the operating system or applications installed on the computing device to obtain a digital image (e.g., print screen, copy and paste, image editor, screen recording software, etc.). Screen captures provide a means to demonstrate or relay information to another user that may be difficult to explain verbally. Additionally, screen captures provide a means for a user to save information that may not be easily saved and/or printed for future use.

Information pertaining to document files, digital images, videos, spreadsheets, and web pages is stored in metadata. Metadata is structured information that describes, explains, locates, or otherwise makes it easier to retrieve, use, or manage an information resource. Three types of metadata include: descriptive (e.g., discovery and identification), structural (e.g., how compound objects are put together), and administrative (e.g., assists to manage a resource). Metadata can be embedded in a digital object (e.g., HTML documents, headers of image files) or stored separately (e.g., database linked to objects described). Internal or embedded metadata stays with the data being described and is available with the data and can be manipulated locally. External or stored metadata allows collocation metadata for all the contents for more efficient searching and management.

SUMMARY

Aspects of the present invention disclose a method, computer program product, and system for creating a screen capture. The method includes one or more computer processors selecting at least a portion of visual output on a computing device, wherein the selected visual output includes one or more instances of application software. The method further includes one or more computer processors identifying metadata associated with the one or more instances of application software in the selected visual output. The method further includes one or more computer processors creating a screen capture file that includes the selected visual output and the identified metadata.

DETAILED DESCRIPTION

Computer-mediated communication (CMC) refers to human communication that occurs through the use of two or more electronic devices (e.g., instant messaging, e-mail, chat rooms, text messaging). CMC provides a means to communicate and collaborate on data regardless of time, geography, or individual considerations. One common means of conveying data to other individuals via CMC is through the creation and use of screen captures. Screen captures allow individuals to communicate and share data effectively with one another without the need to repeatedly recreate the data prior to sharing with another individual (e.g., data can be sent to multiple individuals or to additional individuals as needed without performing tasks associated with obtaining the original data a second time). However, as recognized by embodiments of the present invention, screen captures provide static image files that do not allow recipients to immediately utilize the data within the screen capture without performing additional actions. Embodiments of the present invention create an intelligent screen capture file that allows recipients to interact with the intelligent screen capture files that are capable of accessing local applications and navigating to the same data without a user performing intermediate steps.

Figure 1:
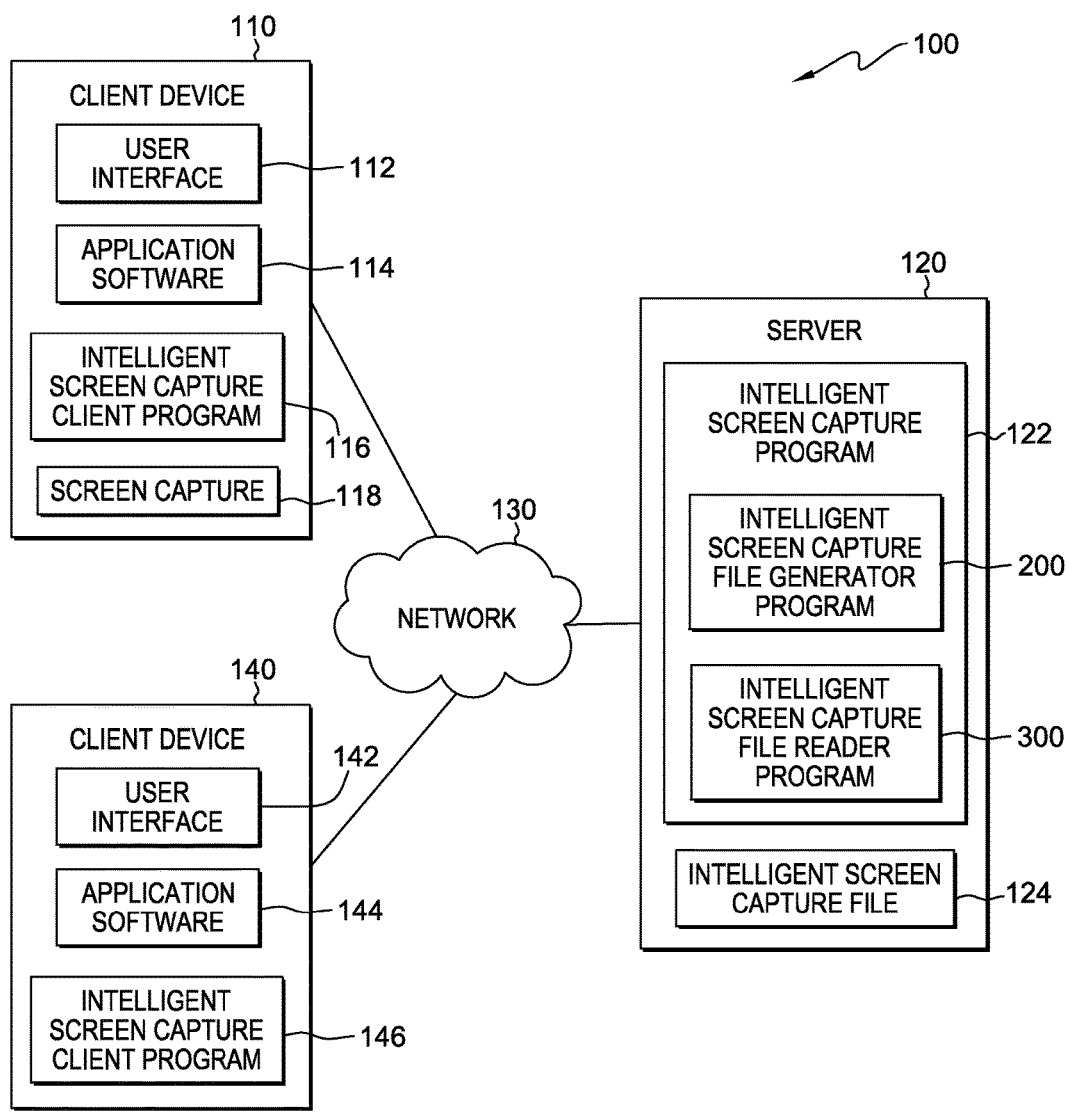
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one embodiment and does not imply any limitations with regard to the environments in which different embodiments may be implemented.

In the depicted embodiment, distributed data processing environment 100 includes client device 110, client device 140, and server 120, all interconnected over network 130. Distributed data processing environment 100 may include additional computing devices, mobile computing devices, servers, computers, storage devices, or other devices not shown.

Client devices 110 and 140 may be web servers or any other electronic devices or computing systems capable of processing program instructions and receiving and sending data. In some embodiments, client devices 110 and 140 may be laptop computers, tablet computers, netbook computers, personal computers (PCs), desktop computers, personal digital assistants (PDAs), smart phones, or any programmable electronic devices capable of communicating with network 130. In other embodiments, client devices 110 and 140 may represent server computing systems utilizing multiple computers as a server system, such as in a cloud computing environment. In general, client devices 110 and 140 are representative of any electronic device or combination of electronic devices capable of executing machine readable program instructions as described in greater detail with regard to FIG. 4, in accordance with embodiments of the present invention. Client device 110 contains user interface 112, application software 114, intelligent screen capture client program 116, and screen capture 118. Client device 140 contains user interface 142, application software 144, and intelligent screen capture client program 146.

User interfaces 112 and 142 are programs that provide an interface between a user of client devices 110 and 140 and a plurality of applications that reside on client devices 110 and 140 (e.g., application software 114, intelligent screen capture client program 116) and/or may be accessed over network 130. A user interface, such as user interfaces 112 and 142, refers to the information (e.g., graphic, text, sound) that a program presents to a user and the control sequences the user employs to control the program. A variety of types of user interfaces exist. In one embodiment, user interfaces 112 and 142 are graphical user interfaces. A graphical user interface (GUI) is a type of interface that allows users to interact with peripheral devices (i.e., external computer hardware that provides input and output for a computing device, such as a keyboard and mouse) through graphical icons and visual indicators as opposed to text-based interfaces, typed command labels, or text navigation. The actions in GUIs are often performed through direct manipulation of the graphical elements. User interfaces 112 and 142 send and receive information through intelligent screen capture client programs 116 and 146 to and from intelligent screen capture program 122.

Application software 114 and application software 144 are a set of one of more programs designed to carry out the operations for a specific application to assist a user to perform an activity (e.g., word processing programs, spread sheet programs, media players, web browsers). In the depicted embodiment, application software 114 and application software 144 reside on client device 110 and client device 140 respectively. In another embodiment, application software 114 and application software 144 may reside on server 120 or on another device (not shown) connected over network 130.

Intelligent screen capture client programs 116 and 146 represent a software application capable of obtaining static screen captures with associated metadata and manipulating intelligent screen capture file 124. Intelligent screen capture client programs 116 and 146 include software that creates a screen capture based on a user action through user interface 112 or user interface 142 and sends the screen capture and associated metadata to intelligent screen capture program 122 (e.g., intelligent screen capture file generator program 200). In one embodiment, intelligent screen capture client programs 116 and 146 may receive intelligent screen capture file 124 from intelligent screen capture program 122. For example after processing, a static screen capture returns to the client device as an intelligent screen capture file for further use. In another embodiment, intelligent screen capture client programs 116 and 146 may receive intelligent screen capture file 124 from another client device, such as client device 110 and client device 140 (e.g., intelligent screen capture file 124 is sent in an e-mail, a text message, etc. from one user to another). Upon receipt of intelligent screen capture file 124, intelligent screen capture client programs 116 and 146 include software to display and interact with intelligent screen capture file 124. In the depicted embodiment, intelligent screen capture client programs 116 and 146 reside on client device 110 and client device 140 respectively. In some other embodiment, intelligent screen capture client programs 116 and 146 may reside on another server or computing device (not shown) connected over network 130 provided intelligent screen capture client programs 116 and 146 is accessible to intelligent screen capture program 122.

Screen capture 118 is a digital image taken by a computing device to record the visible information displayed on a visual output device that is saved as a static graphics file. A user of a computing device (e.g., client device 110 through user interface 112) selects at least a portion of the visual output of the computing device and creates a screen capture utilizing intelligent screen capture client program 116. In the depicted embodiment, screen capture 118 resides on client device 110. In another embodiment screen capture 118 may reside on client device 140. In some other embodiment, screen capture 118 may reside on server 120. In yet some other embodiment, screen capture 118 may reside on another server or computing device (not shown) connected over network 130 provided screen capture 118 is accessible by user interface 112, intelligent screen capture client program 116 (e.g., intelligent screen capture client program 146), and intelligent screen capture file generator program 200.

Server 120 may be a management server, a web server, or any other electronic device or computing system capable of receiving and sending data. In some embodiments, server 120 may be a laptop computer, a tablet computer, a netbook computer, a personal computer (PC), a desktop computer, a personal digital assistant (PDA), a smart phone, or any programmable device capable of communication with client device 110 and client device 140 over network 130. In other embodiments, server 120 may represent a server computing system utilizing multiple computers as a server system, such as in a cloud computing environment. Server 120 contains intelligent screen capture program 122 (includes intelligent screen capture file generator program 200 and intelligent screen capture file reader program 300) and intelligent screen capture file 124.

Intelligent screen capture program 122 is an overall software program (e.g., an application suite) encompassing software to create intelligent screen capture file 124 and to view and interact with intelligent screen capture file 124. In the depicted embodiment, intelligent screen capture program 122 includes intelligent screen capture file generator program 200 and intelligent screen capture file reader program 300. In the depicted embodiment, intelligent screen capture program 122 resides on server 120. In another embodiment, intelligent screen capture program 122 may reside on other devices, such as another server or client device connected over network 130 provided that intelligent screen capture program 122 is accessible to intelligent screen capture client program 116 and intelligent screen capture client program 146 and has access to intelligent screen capture file 124.

Intelligent screen capture file 124 is an interactive digital image of the visible information displayed on a visual output of a client device, such as client device 110 and/or client device 140, as selected by a user through user interface 112 and/or user interface 142. Intelligent screen capture file 124 is associated with enhanced metadata (e.g., from intelligent screen capture file generator program 200), which is capable of optimizing the experience of future users through intelligent screen capture file reader program 300. For example, intelligent screen capture file generator program 200 incorporates the enhanced metadata within the file format of static screen capture 118 and creates intelligent screen capture file 124. The inclusion of the enhanced metadata within intelligent screen capture file 124 allows for a selection to then be made by a user while viewing intelligent screen capture file 124 through intelligent screen capture file reader program 300. Once the selection is made by the user through intelligent screen capture client programs 116 and/or 146 respective to the viewable area of intelligent screen capture file 124, intelligent screen capture file reader program 300 opens application software 114 and/or 144 corresponding to the selection based on the enhanced metadata. In the depicted embodiment, intelligent screen capture file 124 resides on server 120. In another embodiment, intelligent screen capture file 124 may reside on a client device, such as client device 110 and client device 140. In some other embodiment, intelligent screen capture file 124 may reside on other devices, such as another server or computer connected over network 130 provided that intelligent screen capture file 124 is accessible by intelligent screen capture client program 116, intelligent screen capture client program 146, intelligent screen capture file generator program 200, and intelligent screen capture file reader program 300.

Network 130 may be a local area network (LAN), a wide area network (WAN), such as the Internet, a wireless local area network (WLAN), any combination thereof, or any combination of connections and protocols that will support communications between client device 110, client device 140, server 120, and other computing devices and servers (not shown), in accordance with embodiments of the inventions. Network 130 may include wired, wireless, or fiber optic connections.

Intelligent screen capture file generator program 200 is a software program for creating intelligent screen capture file 124 from a static screen capture and associated metadata. Intelligent screen capture file generator program 200 creates intelligent screen capture file 124 for use by intelligent screen capture file reader program 300. In the depicted embodiment, intelligent screen capture file generator program 200 resides on server 120. In another embodiment, intelligent screen capture file generator program 200 resides on client device 110 and/or client device 140. In other embodiments, intelligent screen capture file generator program 200 may reside on other devices, such as another server or computer connected over network 130 provided that intelligent screen capture file generator program 200 is accessible to intelligent screen capture client program 116 and intelligent screen capture client program 146 and has access to intelligent screen capture file 124.

Intelligent screen capture file reader program 300 is a software program for viewing and interacting with intelligent screen capture file 124. Intelligent screen capture file reader program 300 displays intelligent screen capture file 124 to a user through intelligent screen capture client program 116 and/or intelligent screen capture client program 146. Intelligent screen capture file reader program 300 receives user actions though user interface 112 or user interface 142 and opens local applications based on the information in intelligent screen capture file 124. In the depicted embodiment, intelligent screen capture file reader program 300 resides on server 120. In another embodiment, intelligent screen capture file reader program 300 resides on client device 110 and/or client device 140. In other embodiments, intelligent screen capture file reader program 300 may reside on other devices, such as another server or computer connected over network 130 provided that intelligent screen capture file reader program 300 is accessible to intelligent screen capture client program 116 and intelligent screen capture client program 146 and has access to intelligent screen capture file 124.

Figure 2:
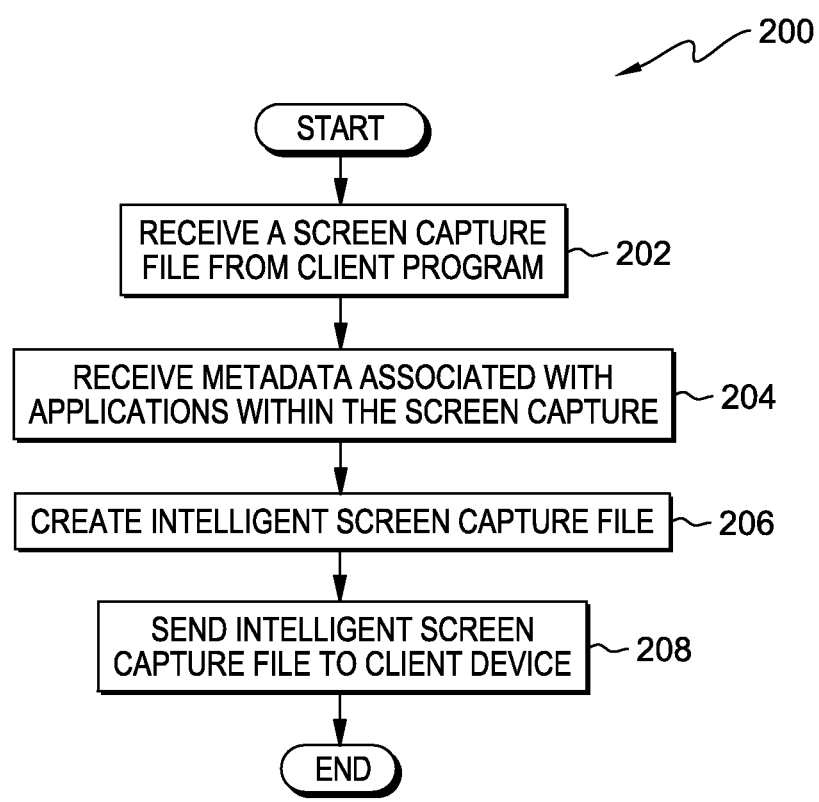
FIG. 2 is a flowchart depicting operational steps of an intelligent screen capture file generator program, on a server computer within the data processing environment of FIG. 1, a program for generating an intelligent screen capture file that includes capabilities to activate local applications, in accordance with an embodiment of the present invention.

FIG. 2 is a flowchart depicting operational steps of intelligent screen capture file generator program 200, a program for generating intelligent screen capture file 124 that includes capabilities to activate local applications, in accordance with an embodiment of the present invention.

In step 202, intelligent screen capture file generator program 200 receives screen capture 118 from intelligent screen capture client program 116. In one embodiment, a user of client device 110, utilizing user interface 112, selects the entire viewable area of a visual output device that displays the information the user views. In another embodiment, a user of client device 110, utilizing user interface 112, selects a portion of the entire viewable area of a visual output device that displays specific information the user views. After selecting at least a portion of the viewable area of the visual output device, the user of client device 110 then utilizes screen capture software functions (e.g., intelligent screen capture client program 116, print screen, copy and paste, shortcut keys on a keyboard, mouse and scroll selection, additional screen capture software application, etc.) to create screen capture 118. Intelligent screen capture client program 116 then sends screen capture 118 to intelligent screen capture file generator program 200. In another embodiment, intelligent screen capture file generator program 200 utilizes intelligent screen capture client program 116 to create screen capture 118 based on input of a user of client device 110.

In step 204, intelligent screen capture file generator program 200 receives metadata associated with application software 114 within screen capture 118 from intelligent screen capture client program 116. The metadata may include registry information, such as configuration settings and options, retrieved data, uniform resource locators (URLs), component status (e.g., active or inactive), and configuration information (e.g., file extension). In one embodiment, intelligent screen capture file generator program 200 receives metadata associated with one single application software 114. For example, screen capture 118 includes only an open document file. The metadata associated with screen capture 118 includes the document file name, associated application software 114 for the word processing application, and the location of the document file, such as the path to access the document file on a network shared resource. In another embodiment, intelligent screen capture file generator program 200 receives metadata associated with multiple applications as application software 114. For example, screen capture 118 includes the entire screen, which displays a web browser with multiple tabs, the aforementioned document file, media player, and pop-up windows. The metadata includes application software 114 associated with the web browser, word processing application, and media player, the various URLs for the tabs within the web browser, the document file name and location, and status of the pop-up windows.

In another embodiment, intelligent screen capture file generator program 200 identifies the metadata based on the selection of screen capture 118. For example, a selection tool highlights a word processing program and a web browser within a square for inclusion in screen capture 118. After screen capture 118 is obtained, intelligent screen capture file generator 200 utilizes the boundaries set by the selection tool and identifies the metadata associated with application software 114 within the selection. In some other embodiment, intelligent screen capture file generator program 200 identifies the metadata associated with application software 114 within screen capture 118 by accessing a metadata repository. The metadata repository is a database created to store and catalog metadata that includes information pertaining to ownership, descriptive characteristics, rules and policies, and physical characteristics. Intelligent screen capture file generator program 200 identifies active application software 114 in the metadata repository and stores the metadata for later use.

In step 206, intelligent screen capture file generator program 200 creates intelligent screen capture file 124. Intelligent screen capture file generator program 200 combines screen capture 118 (e.g., static screen capture) with the received metadata and forms intelligent screen capture file 124 (e.g., interactive screen capture). In one embodiment, intelligent screen capture file generator program 200 assigns the received metadata uniformly to screen capture 118 (e.g., all pixels include identical information) and creates intelligent screen capture file 124. For example, screen capture 118 includes only a web browser with three separate tabs for different URLs. Intelligent screen capture file generator program 200 assigns the metadata associated with the three tabs indicating the separate URL, tab placement, and activity status of the three web pages within intelligent screen capture file 124 uniformly (as all the metadata pertains to the web browser).

In another embodiment, intelligent screen capture file generator program 200 may incorporate image processing software. Image processing software is capable of identifying objects and the boundaries associated with the objects within a digital image, such as screen capture 118. Once intelligent screen capture file generator program 200 identifies objects (e.g., depictions of application software 114 areas), intelligent screen capture file generator program 200 assigns metadata to the specific pixel coordinates as defined by boundaries located within screen capture 118, and creates intelligent screen capture file 124. For example, screen capture 118 encompasses the entire visual output on client device 110, including an open web browser, a word processing document, and a media player. Intelligent screen capture file generator program 200 locates the boundaries within screen capture 118 that correspond to the web browser, word processing document, and media player. Intelligent screen capture file generator program 200 then locates and assigns the metadata corresponding to the pixel coordinates within the boundaries for the web browser, word processing document, and media player. Then, intelligent screen capture file generator program 200 stores the metadata specific to each instance of application software 114 individually for future utilization.

In step 208, intelligent screen capture file generator program 200 sends intelligent screen capture file 124 to client device 110 and/or client device 140. In one embodiment, intelligent screen capture file generator program 200 sends intelligent screen capture file 124 to intelligent screen capture client program 116 (i.e., returns intelligent screen capture file 124 to originating client device 110 for future action and/or use). For example, the user of client device 110 wants to revisit the current information and settings displayed on client device 110 at a later time without repeating numerous steps to reach the same point. Through intelligent screen capture client program 116, the user selects the entire screen of client device 110, and intelligent screen capture file generator program 200 creates and returns intelligent screen capture file 124 to client device 110. In another embodiment, intelligent screen capture file generator program 200 sends intelligent screen capture file 124 to client device 140. For example, the user of client device 110 wants to share the current information and settings displayed on client device 110 with the user of client device 140. The user of client device 110 selects the information for screen capture 118 through intelligent screen capture client program 116 and selects an additional option within intelligent screen capture client program 116 to e-mail intelligent screen capture file 124 to the user of client device 140. In some other embodiment, intelligent screen capture file generator program 200 may send intelligent screen capture file 124 to both client device 110 and client device 140. (e.g., retains a copy of intelligent screen capture file 124 of client device 110 for future use and sends intelligent screen capture file 124 to client device 140 for sharing purposes).

Figure 3:
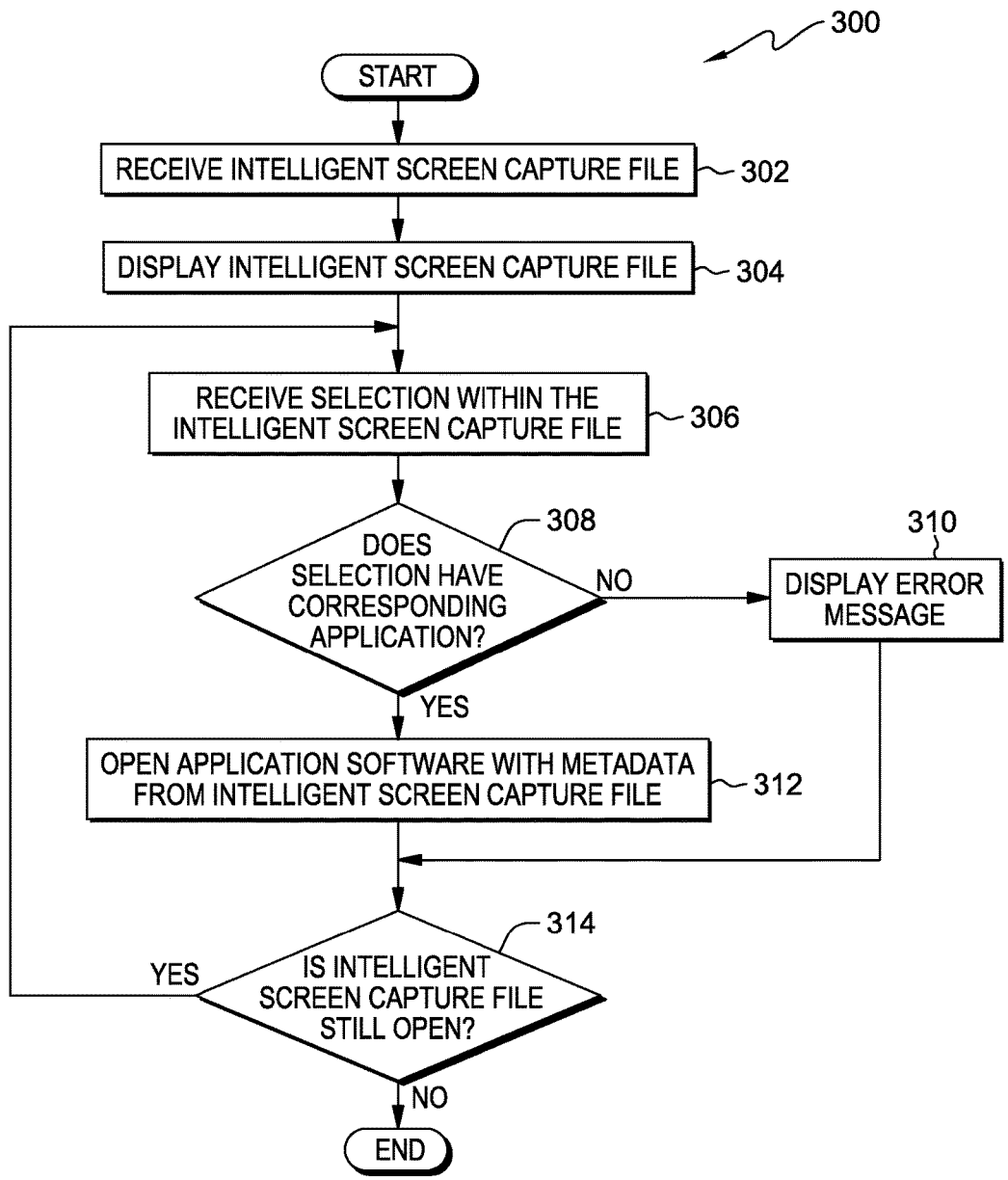
FIG. 3 is a flowchart depicting operational steps of an intelligent screen capture file reader program, installed on a client device within the data processing environment of FIG. 1, a program for displaying and interacting with the intelligent screen capture file, in accordance with an embodiment of the present invention.

FIG. 3 is a flowchart depicting operational steps of intelligent screen capture file reader program 300, a program for displaying and interacting with intelligent screen capture file 124, in accordance with an embodiment of the present invention. A user (e.g., of client device 110 or client device 140) can exit intelligent screen capture file reader program 300 at any point by closing intelligent screen capture client program 146 and/or closing intelligent screen capture file 124.

In step 302, intelligent screen capture file reader program 300 receives intelligent screen capture file 124 through intelligent screen capture client program 146. In one embodiment, intelligent screen capture file reader program 300 receives intelligent screen capture file 124 in response to the user of client device 140 opening intelligent screen capture file 124 after receipt of intelligent screen capture file 124 from client device 110 (e.g., sent intelligent screen capture file 124 through e-mail, text message, online chat, etc.). In another embodiment, intelligent screen capture file reader program 300 receives intelligent screen capture file 124 in response to the user opening a previously saved intelligent screen capture file 124 (e.g., stored locally on client device 110 or on server 120). In some other embodiment, intelligent screen capture file reader program 300 receives intelligent screen capture file 124 from intelligent screen capture file generator program 200 at the time intelligent screen capture file generator program 200 completes creation of intelligent screen capture file 124 (e.g., intelligent screen capture file reader program 300 automatically opens intelligent screen capture file 124 for viewing).

In step 304, intelligent screen capture file reader program 300 displays intelligent screen capture file 124 through intelligent screen capture client program 146 (e.g., or intelligent screen capture client program 116). Intelligent screen capture file reader program 300 displays what initially appears to be a static image of intelligent screen capture file 124; however, metadata associated with the original application software 114 resides within intelligent screen capture file 124 for future use. For example, the user of client device 140 selects to open intelligent screen capture file 124 from an e-mail attachment, and intelligent screen capture client program 146 activates intelligent screen capture file reader program 300. Intelligent screen capture file reader program 300 accesses both the static image portion of intelligent screen capture file 124 and the associated metadata but displays only an image until a selection is made. While another type of screen capture application or graphic software may be able to open intelligent screen capture file 124, the associated metadata would not be accessible, resulting in the display of only the static image portion.

In step 306, intelligent screen capture file reader program 300 receives a selection within intelligent screen capture file 124. The user of client device 140 makes a selection through user interface 142 via intelligent screen capture client program 146. In one embodiment, intelligent screen capture file reader program 300 includes predetermined system shortcut keys and/or gestures to allow for selections (e.g., pre-programmed with common manners of selection). For example, a single finger tap on a touchscreen device, single mouse click, or depressing and holding the CTRL key with the TAB key advances through allowable selections. In another embodiment, intelligent screen capture file reader program 300 receives user defined shortcut keys and gestures to make a selection through intelligent screen capture client program 146. For example, on a mobile device with touchscreen capabilities, the user may define a circling gesture around a selection to indicate selection.

In one embodiment, intelligent screen capture file reader program 300 receives the selection when the user, through user interface 142, presses shortcut keys associated with a selection within intelligent screen capture file 124. In another embodiment, intelligent screen capture file reader program 300 receives the selection within intelligent screen capture file 124 through gestures through user interface 142. In some other embodiment, intelligent screen capture file reader program 300 may provide a list of application software 114 included in intelligent screen capture file 124 that the user may select from utilizing intelligent screen capture client program 146. In one embodiment, intelligent screen capture file reader program 300 receives a selection of the entirety of intelligent screen capture file 124 (e.g., select all function). In another embodiment, intelligent screen capture file reader program 300 receives a specific selection within intelligent screen capture file 124 (e.g., images include boundaries and specific metadata).

In decision 308, intelligent screen capture file reader program 300 determines whether the selection within intelligent screen capture file 124 includes a corresponding application software 144 on client device 140. Intelligent screen capture file reader program 300 accesses the metadata associated with the selection from step 306. From the metadata, intelligent screen capture file reader program 300 identifies corresponding instances of application software 114 and viewable information (e.g., file name, location, web page address, file extension, etc.). Intelligent screen capture file reader program 300 then searches available instances of application software 144 for a local corresponding version of application software 114.

In one embodiment, intelligent screen capture file reader program 300 determines that the metadata of intelligent screen capture file 124 indicates application software 114, which is available on client device 140 within application software 144. For example, two users in a department are collaborating on a project and both users perform work on company asset computing devices with identical operating systems and software suites. The first of the two users wants to share project information for a presentation stored on a shared network and sends intelligent screen capture file 124 to the second user (e.g., includes metadata pertaining to application software 114 and the presentation file). The second user then opens intelligent screen capture file 124 and selects an area that corresponds to the presentation within intelligent screen capture file 124. Intelligent screen capture file reader program 300 utilizes the selection and corresponding metadata within intelligent screen capture file 124, which first identifies the presentation program associated with application software 114 and then identifies the identical presentation program within application software 144 on client device 140. As the two presentation programs are identical, intelligent screen capture file reader program 300 determines a corresponding application is available.

In another embodiment, intelligent screen capture file reader program 300 may determine similar application software 144 to application software 114 is available on client device 140 based on a file extension within the metadata associated with intelligent screen capture file 124. Intelligent screen capture file reader program 300 may associate the file extensions with additional various programs capable of opening the file. For example, Joint Photographic Experts Group (JPEG), Graphic Interchange Format (GIF), Portable Network Graphics (PNG), Bitmap (BMP), and Tagged Image File Format (TIFF) files are image file formats capable of being opened in multiple types of image viewing software. Intelligent screen capture file reader program 300 can access a cross reference listing of file types to compare to available application software 144 and determine corresponding application software 144.

In another embodiment, intelligent screen capture file reader program 300 may determine similar application software 144 to application software 114 based on a lookup table of programs. The lookup table may include a listing of comparable instances of application software 114 and application software 144 (e.g., operating system equivalent comparable programs, device variations, etc.). For example, client device 110 is a desktop computer utilizing one operating system and software suite, and client device 140 is a mobile device utilizing a different operation system and software suite but includes similar capabilities. The user of client device 110 sends intelligent screen capture file 124 to the user of client device 140, which includes a web browser with a web page for a restaurant. The user of client device 140 taps a finger on the image of the restaurant indicating a selection. In response to the user selection, intelligent screen capture file reader program 300 then accesses the metadata within intelligent screen capture file 124 and identifies application software 114 to be a specific web browser. However, intelligent screen capture file reader program 300 is unable to locate the same specific web browser in application software 144 but does identify another different web browser within application software 144. As the web browser within application software 144 is capable of accessing the web page similar to the specific web browser associated with application software 114, intelligent screen capture file reader program 300 determines the web browser of application software 144 is similar and may be used in place of the specific web browser noted in the metadata of intelligent screen capture file 124. Intelligent screen capture file reader program 300 then opens the restaurant web page in the similar web browser.

If intelligent screen capture file reader program 300 determines the selection within intelligent screen capture file 124 includes corresponding application software 144 on client device 140 (decision 308, yes branch), then intelligent screen capture file reader program 300 opens application software 144 based on the metadata associated with the selection within intelligent screen capture file 124 (step 312). If intelligent screen capture file reader program 300 determines the selection within intelligent screen capture file 124 does not include corresponding application software 144 on client device 140 (decision 308, no branch), then intelligent screen capture file reader program 300 displays an error message (step 310).

In step 310, intelligent screen capture file reader program 300 displays an error message. For example, intelligent screen capture file 124 includes a multi-dimensional schematic drawing created by specialized design software (e.g., application software 114). Intelligent screen capture file reader program 300 does not identify the specialized design software or similar functioning design software within application software 144; therefore, an error results (e.g., file cannot be opened for viewing). In one embodiment, intelligent screen capture file reader program 300 may display a message indicating the action cannot be completed. In another embodiment, intelligent screen capture file reader program 300 may provide an option to reply to the sender (e.g., user of client device 110) regarding the error. In some other embodiment, intelligent screen capture file reader program 300 may provide the user a prompt with a direct link to download application software 144 from another source (e.g., application store) over network 130.

In step 312, intelligent screen capture file reader program 300 opens application software 144 based on the metadata associated with the selection within intelligent screen capture file 124. In one embodiment, application software 144 is not currently active on client device 140 and intelligent screen capture file reader program 300 selects application software 144 and initiates application software 144 (e.g., opens the program for use). In another embodiment, application software 144 is already open on client device 140, but is not the current active application. Intelligent screen capture file reader program 300 would then select application software 144, which would then be active. Intelligent screen capture file reader program 300 then provides application software 144 with the remaining metadata providing information pertaining to the information displayed in intelligent screen capture file 124 (e.g., file name with location, web page URLs, state of a pop-up window, etc.).

In an example continuing the presentation example, intelligent screen capture file reader program 300 first opens and/or activates the presentation program (e.g., metadata identifies the presentation program executable that is also located on client device 140). Intelligent screen capture file reader program 300 can then provide at least an indication of the file name and network path stored within the metadata to the opened presentation program (e.g., z:\localnetwork\presentation.otp), which can retrieve and display the presentation file. In another example, a help desk employee is attempting to fix a network connection remotely for a customer. Rather than talking the customer through the steps to reach the network connection settings window that needs to be updated, the help desk employee sends intelligent screen capture file 124 to the customer. Upon receipt, the customer then opens intelligent screen capture file 124 and selects the network connection settings window. Intelligent screen capture file reader program 300 utilizes the metadata, which identifies the status of the specific network settings window included in intelligent screen capture file 124. Intelligent screen capture file reader program 300 then sets the status of client device 140 to that of the metadata for the network settings window included in intelligent screen capture file 124 and automatically opens the appropriate identical network settings window on client device 140. Client device 140 thus reaches the same network connections setting window as that in intelligent screen capture file 124 but without requiring the customer to perform the previous steps in order to reach the same network connection settings window.

In decision 314, intelligent screen capture file reader program 300 determines whether intelligent screen capture file 124 is still open. Intelligent screen capture file reader program 300 remains active while intelligent screen capture file 124 is available for viewing. If intelligent screen capture file reader program 300 determines intelligent screen capture file 124 is still open (decision 314, yes branch), then intelligent screen capture file reader program 300 returns to receive a selection within intelligent screen capture file 124 (step 306). Intelligent screen capture file reader program 300 then repeats step 306 through 314 until intelligent screen capture file 124 closes. If intelligent screen capture file reader program 300 determines intelligent screen capture file 124 is closed (decision 314, no branch), then intelligent screen capture file reader program 300 completes.

Figure 4:
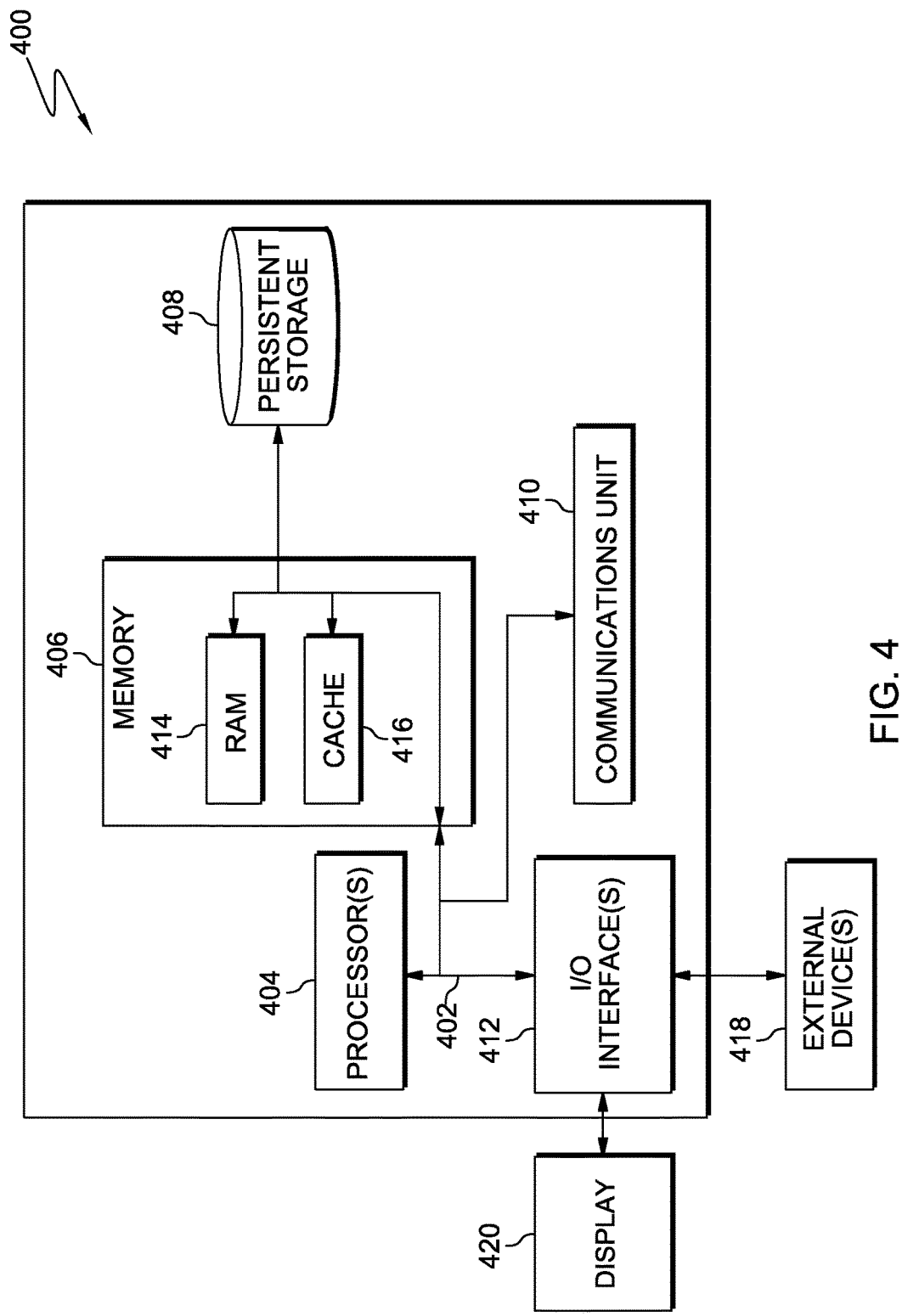
FIG. 4 is a block diagram of components of the server computer and client devices executing the intelligent screen capture file generator program and the intelligent screen capture file reader program, in accordance with an embodiment of the present invention.

FIG. 4 depicts a block diagram of components of distributed data processing environment 400. It should be appreciated that FIG. 4 provides only an illustration of one implementation and does not imply any limitations with regard to the environments in which different embodiments may be implemented. Many modifications to the depicted environment may be made.

Distributed data processing environment 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media.

User interface 112, application software 114, intelligent screen capture client program 116, screen capture 118, user interface 142, application software 144, intelligent screen capture client program 146, intelligent screen capture program 122, intelligent screen capture file 124, intelligent screen capture file generator program 200, and intelligent screen capture file reader program 300 are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of enterprise grid and client devices. In these examples, communications unit 410 includes one or more network interface cards. Communications unit 410 may provide communications through the use of either or both physical and wireless communications links. User interface 112, application software 114, intelligent screen capture client program 116, screen capture 118, user interface 142, application software 144, intelligent screen capture client program 146, intelligent screen capture program 122, intelligent screen capture file 124, intelligent screen capture file generator program 200, and intelligent screen capture file reader program 300 may be downloaded to persistent storage 408 through communications unit 410.

I/O interface(s) 412 allows for input and output of data with other devices that may be connected to distributed data processing environment 400. For example, I/O interface 412 may provide a connection to external devices 418, such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., User interface 112, application software 114, intelligent screen capture client program 116, screen capture 118, user interface 142, application software 144, intelligent screen capture client program 146, intelligent screen capture program 122, intelligent screen capture file 124, intelligent screen capture file generator program 200, and intelligent screen capture file reader program 300 can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for creating an interactive screen capture, the method comprising:
    selecting, by one or more computer processors, at least a portion of visual output on a computing device, wherein the selected visual output includes one or more instances of application software;
    creating, by one or more computer processors, a static digital image based on the selected at least portion of the visual output;
    accessing, by one or more computer processors, a metadata repository that includes ownership, descriptive characteristics, rules, policies, and physical characteristics associated with the one or more instances of application software;
    identifying, by one or more computer processors, metadata associated with the one or more instances of application software in the created static digital image from the accessed metadata repository, wherein the identified metadata indicates that the one or more instances of application software are active;
    creating, by one or more computer processors, an interactive screen capture file that includes the created static digital image and the identified metadata, wherein the interactive screen capture file enables a selection of at least one of the one or more instances of application software from within the interactive screen capture file while viewing;
    receiving, by one or more computer processors, the created interactive screen capture file;
    displaying, by one or more computer processors, the created interactive screen capture file;
    receiving, by one or more computer processors, a selection within the created interactive screen capture file, wherein the selection identifies pixels associated with a specific image within the created interactive screen capture file that includes a boundary with corresponding metadata;
    determining, by one or more computer processors, application software that corresponds to the received selection based, at least in part, on the corresponding metadata included in the created interactive screen capture file, wherein the corresponding metadata is within the pixels associated with the specific image within the boundary of the created interactive screen capture file that is associated with the received selection;
    opening by one or more computer processors, the determined application software;
    providing, by one or more computer processors, the application software with information pertaining to the information presented in the instance of the application at the time of capture using metadata included in the interactive screen capture file;
    retrieving and displaying, by the one or more computer processors, through the opened application software, the presented information.

2. The method of claim 1, wherein the identified metadata comprises one or more of: registry information, configuration settings, options, retrieved data, uniform resource locators, component status, configuration information, file extensions, application software, and storage locations for one or more application software, wherein the component status includes one of an active and inactive for each of the one or more instances of application software within the accessed metadata repository.

3. The method of claim 1, wherein creating the interactive screen capture file that includes the created static digital image and the identified metadata further comprises:
    determining, by one or more computer processors, a first area of the created static digital image that includes a depiction of a first application software;
    determining, by one or more computer processors, boundaries of the determined first area that correspond to the depiction of the first application software utilizing image processing; identifying, by one or more computer processors, from the metadata associated with the one or more instances of application software, metadata associated with the first application software; and
    assigning, by one or more computer processors, the identified metadata associated with the first application software uniformly to pixels within the determined boundaries associated with the determined first area, wherein the determined boundaries identify coordinates of the pixels for the first application software within the created static digital image.

4. The method of claim 3, wherein creating the interactive screen capture file that includes the created static digital image and the identified metadata further comprises:
    determining, by one or more computer processors, a second area of the created static digital image that includes a depiction of a second application software;
    determining, by one or more computer processors, boundaries of the determined second area that correspond to the depiction of the second application software utilizing the image processing;
    identifying, by one or more computer processors, from the metadata associated with the one or more instances of application software, metadata associated with the second application software; and assigning, by one or more computer processor, the identified metadata associated with the second application software within the determined boundaries associated with the determined second area, wherein the determined boundaries identify coordinates of the pixels for the second application software within the created static digital image.

5. The method of claim 1, wherein determining application software that corresponds to the received selection further comprises: accessing, by one or more computer processors, metadata that corresponds to the received selection; searching, by one or more computer processors, application software available on the computing device based, at least in part, on the accessed metadata; and determining, by one or more computer processors, whether the computing device includes application software that is capable of opening information included in the received selection within the created screen capture file.

6. The method of claim 1, wherein opening the determined application software further comprises: identifying, by one or more computer processors, within the metadata of the screen capture file, at least an indication of a network file path to the determined application software; and opening, by one or more computer processors, the determined application software utilizing the identified network file path to the determined application software.

7. The method of claim 1, further comprising:
receiving, by one or more computer processors, a selection within the created interactive screen capture file with corresponding metadata;
determining, by one or more computer processors, whether the computing device includes an application software that matches an application software within the corresponding metadata of the received selection;
responsive to determining the computing device does not include the application software that matches the application software within the corresponding metadata, determining, by one or more computer processors, a similar application software based, at least in part, on a lookup table, wherein the lookup table includes a list of equivalent comparable similar application software that is capable of opening the received selection in place of the application software within the corresponding metadata; and
opening, by one or more computer processors, the determined similar application software.

8. The method of claim 1, further comprising:
receiving, by one or more computer processors, a selection within the created interactive screen capture file with corresponding metadata, wherein the metadata includes a network connection setting; and
automatically setting, by one or more computer processors, identical network settings based on the received selection.

9. The method of claim 3, further comprising:
identifying, by one or more computer processors, another instance of metadata within the determined first area, wherein the another instance of metadata utilizes the first application software, wherein the another instance of metadata within the determined first area is different from the identified metadata associated with the determined first area;
determining, by one or more computer processors, boundaries of a second area that includes the another instance of metadata that correspond to a depiction of the second instance of the first application software utilizing the image processing; and
assigning, by one or more computer processor, the identified another instance of metadata associated with the determined second area within the determined first area within the determined boundaries associated with the determined second area, wherein the determined boundaries identify coordinates of the pixels for the identified another instance of metadata within the created static digital image.

* * * * *